United States Patent
Colangelo

(10) Patent No.: US 8,881,687 B2
(45) Date of Patent: Nov. 11, 2014

(54) PROTECTIVE PETWEAR

(75) Inventor: Marcy Colangelo, Weston, FL (US)

(73) Assignees: Marcy Colangelo, Weston, FL (US); Vincent Colangelo, Weston, FL (US)

( * ) Notice: Subject to any disclaimer, the term of this patent is extended or adjusted under 35 U.S.C. 154(b) by 53 days.

(21) Appl. No.: 12/723,391

(22) Filed: Mar. 12, 2010

(65) Prior Publication Data

US 2011/0030623 A1    Feb. 10, 2011

Related U.S. Application Data

(60) Provisional application No. 61/231,865, filed on Aug. 6, 2009.

(51) Int. Cl.
| | | |
|---|---|---|
| *A01K 15/04* | (2006.01) | |
| *A01K 13/00* | (2006.01) | |
| *A61D 9/00* | (2006.01) | |

(52) U.S. Cl.
CPC ............... *A01K 13/007* (2013.01); *A61D 9/00* (2013.01); *A01K 13/006* (2013.01)
USPC .......................................... 119/815; 119/855

(58) Field of Classification Search
USPC ................... 119/814, 815, 850, 855
IPC ..................................................... A01K 15/04
See application file for complete search history.

(56) References Cited

U.S. PATENT DOCUMENTS

| | | | |
|---|---|---|---|
| 2,806,471 A | 9/1957 | Breese | |
| 4,413,588 A | 11/1983 | Lindholm | |
| 4,476,814 A | 10/1984 | Miller | |
| 4,800,871 A * | 1/1989 | Florjancic | 602/18 |
| 5,133,295 A | 7/1992 | Lippincott | |
| 5,421,760 A * | 6/1995 | Blaga | 441/123 |
| 5,628,283 A * | 5/1997 | Huegelmeyer | 119/815 |
| 5,778,828 A | 7/1998 | Klinkhart et al. | |
| 6,044,802 A * | 4/2000 | Schmid et al. | 119/856 |
| 6,244,222 B1 * | 6/2001 | Bowen | 119/856 |
| 6,659,046 B2 | 12/2003 | Schmid et al. | |
| 2003/0150401 A1* | 8/2003 | Schmid et al. | 119/815 |
| 2007/0181080 A1* | 8/2007 | Gibson | 119/815 |
| 2009/0107419 A1* | 4/2009 | Davis | 119/815 |
| 2009/0241855 A1* | 10/2009 | Stocki et al. | 119/815 |
| 2010/0192871 A1* | 8/2010 | Winestock | 119/855 |

FOREIGN PATENT DOCUMENTS

| | | |
|---|---|---|
| FR | 2823641 | 4/2001 |
| WO | WO2011017058 A1 | 2/2011 |

OTHER PUBLICATIONS

Inflatable Technologies internet article, http://www.raftrepair.com/repair.php.*

(Continued)

*Primary Examiner* — Shadi Baniani
(74) *Attorney, Agent, or Firm* — Malloy & Malloy, P.L.

(57) ABSTRACT

A protective petwear collar (20) includes an inflatable bladder (22 and 24) forming a substantially "C" shaped body having an central open area (23) for receiving a neck of a pet and an opening (33) formed by two opposing end portions (34 and 36). The collar includes fasteners (25, 27, 28) for securing the two opposing end portions. The inflatable bladder expands radially outward from a dog's neck in a uniform shape.

8 Claims, 3 Drawing Sheets

(56) References Cited

OTHER PUBLICATIONS

Patent Cooperation Treaty, "International Search Report and Written Opinion", ISA/US, by Officer Blaine R. Copenheaver in PCT Application No. PCT/US2010/043268, Document of 8 pages dated Sep. 16, 2010.
PETCO Animal Supplies, Inc., "ProCollar Premium Inflatable Protective Collar", http://www.petco.com/product/100555/ProCollar-Premium-Inflatable-Protective-Collar.aspx, 4 pages article; Web Site last visited Mar. 12, 2010.

Uptown Dog Club, Inc., "Comfy Cone Soft Pet E-Collar Alternative", Fun Stuff for Dogs.com, http://www.funstufffordogs.com/Qstore.cgi?CMD=011&PROD=1191609772&PNAME=Comfy . . . , 4 pages article; Web Site last visited Mar. 12, 2010.

* cited by examiner

PROTECTIVE PETWEAR

CROSS-REFERENCE TO RELATED APPLICATIONS

This application claims the priority of U.S. Provisional Application No. 61/231,865, which was filed on Aug. 6, 2009 and which is incorporated herein.

BACKGROUND OF THE INVENTION

1. Field of the Invention

This invention relates to post surgical pet collars such as restrictive pet collars used to keep animals from inflicting injury on themselves.

2. Description of the Related Art

Typically veterinarians use stiff Elizabethan style plastic post surgical pet collars to keep animals that have been injured or are prone to excessive biting or licking of themselves from irritating the afflicted area. These collars are often bulky and uncomfortable and may be frightening and confusing to the animals, causing additional problems for the animal including keeping them from their daily activities. Post surgical pet collars come in many different forms that include foam or inflatable portions. The few collars that are inflatable typically require attachment of the surgical collar the dog's existing collar or a separate attached shawl to provide a snug fit. Also, a number of the inflatable collars are uniform in shape and make it difficult to fit a wide range of pet sizes and uncomfortable for the pets themselves. In most cases, the existing post surgical pet collars are measured from the neck to the snout of the pet. As will become apparent with the description of the embodiments claimed herein, the existing sizing schemes and corresponding collars can result in bulky devices that don't necessarily provide the most appropriate comfort and sizing for a pet recovering from surgery.

A number of alternative post surgical pet collars have been developed, many of which are also uncomfortable and stiff, and often are also unattractive, often being repellant to the pet owners and observers. Some of the prior collars are somewhat softer and less stiff than the traditional stiff Elizabethan style plastic collars, and include a variety of foam or other soft materials in their construction. Some of these collars have hardware or other added components to attach them to or hold them on the animal's neck. Examples of such collars are found in the following patents and the patents discussed therein.

The collar of Miller (U.S. Pat. No. 4,476,814) utilizes a split doughnut-shaped foam piece the ends of which are held together by a drawstring releasably locked together with a spring clamp or the like.

The restraint collar of Lippincott (U.S. Pat. No. 5,133,295) comprises two side-by-side floppy rings of soft padding such as laminated medical padding, which are sown together along their inner margins and have a drawstring in a passage. The rings have adjacent faces of a plastic material and opposite faces of a soft absorbent material, and are gathered to form radial pleats.

The protective pet collar of Klinkhart et al. (U.S. Pat. No. 5,778,828) has two sheets of hard but flexible material, such as low density polyethylene, fastened around the animal's neck, which may have a foam pad to make the collar more comfortable to the animal. This collar has a width adjustment made possible by a series of male and female fasteners.

The recovery collar of Schmid et al. (U.S. Pat. No. 6,044,802) has the shape of a round pillow with a central aperture. The round pillow is formed by either a single large disk or by a large and a small disk glued together or molded as one piece. Each disk is made of foam. The disks are covered with vinyl and the cover also forms a shawl extending into the aperture and having a drawstring that is tightened to fit comfortably around the animal's neck.

The adjustable pet collar of Bowen (U.S. Pat. No. 6,244,222) is simply a split cylinder of foam that is held in place on the animal's neck with a hook strap of Velcro™.

The split Elizabethan collar of Schmid (U.S. Pat. No. 6,659,046) is inflatable by means of a valve filling the collar or a circular bladder within the collar. The collar may also include a piece of foam placed in the collar or the collar may be permanently inflated. The split in the collar allows the collar to be placed around an animal's neck without slipping it over the animal's head, and then a drawstring is used to secure a shawl on the collar to the animal. The Elizabethan collar is circular in shape having an outer periphery. A central aperture forms an opening for the animal's head. The collar is inflatable, either having a valve filling the collar or a circular bladder placed within the collar and having a valve extending through the cover of the collar for access by the user. In addition to being inflatable, a foam layer may be provided in the collar or the collar may be permanently preinflated without a valve. With the provision of a valve, the foam can be compressed and the valve closed. With the valve closed, the foam will not re-expand until the user opens the valve. This allows the collar to assume a compact configuration when not in use. The collar can be split from the inner periphery formed by the central aperture to the outer periphery of the collar. The two edges formed by the split are joined to one another. The split allows the collar to be put around the animal's neck without sliding the collar over the animal's head.

DETAILED DESCRIPTION

Figure 1:
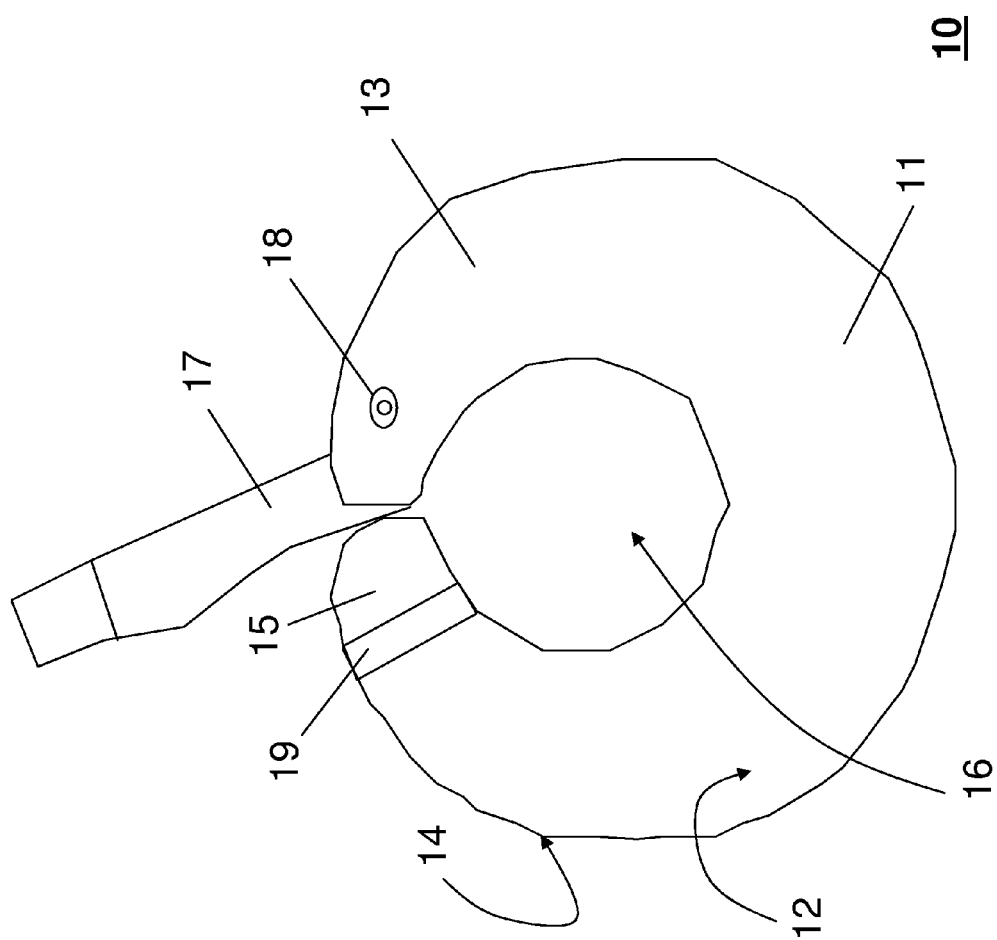
FIG. 1 is a front plane view of a post surgical protective petwear collar in accordance with an embodiment herein.

Referring to FIG. 1, a surgical pet collar or protective petwear collar 10 is illustrated in accordance with the embodiments herein. The collar 10 can comprise an upper surface 12 and a lower surface 14 joined to form an inflatable body having central aperture area 16, where the body is substantially U shaped having a larger curved bottom portion 11 and two tapered top portions 13 and 15. The U shape forms a slit creating two edges extending from the central aperture area 16. The collar 10 can further include fasteners for securing the two tapered top portions 13 and 15 together. The fasteners can be in a number forms including snaps, hook and loop fasteners (such as Velcro) or other fasteners. The fastener shown in FIG. 1, includes a strip 17 of Velcro that can slip through a band 19 and then folded back onto the strip 17. Such arrangement can allow for adjustment for a wide range of sizes about a pet's neck. The collar has such a wide range of size adjustment not only because of the strip 17, but further because the two end portions can be overlapped over each other for even smaller size necks and for a snug fit that still provides comfort to the pet. Having a snug fit directly on the pet's neck further prevents the collar 10 from rotating around the neck. Other collars that are more uniform in shape will tend to rotate. The collar 10 can further comprise an inflation valve 18 extending from the inflatable body.

The protective petwear collar 10 can be made of any number of materials, but it generally will form an inflatable bladder. For example, the upper and lower surfaces or the inflatable bladder can be made of vinyl. The inflatable bladder can form a substantially U-shaped body having a larger curved outer portion 11 extending out to two opposing end portions (13 and 15) as noted above. In one particular embodiment, the larger curved outer portion 11 can be approximately 6 inches and the central aperture area can be approximately 6 inches across when the inflatable bladder is inflated and unsecured. The two opposing tapered top portions 13 and 15 can each be approximately 3 inches or less across.

The protective petwear collar 10 can take on the form of an inflatable neck pillow for humans, but should include an adequate means of securing the pillow to the pet's neck which would not normally be found with neck pillows used for humans. Furthermore, the collar 10 should be thick enough at the outer portion 11 to prevent the pet from extending its paws towards its mouth or its snout toward its paws while still allowing the pet to feed from a bowl or comfortably rest when lying down. The inflatable pillow can also deflate for compact and efficient storage that takes up little space in a person's home or at a veterinarian's clinic.

Figure 2:
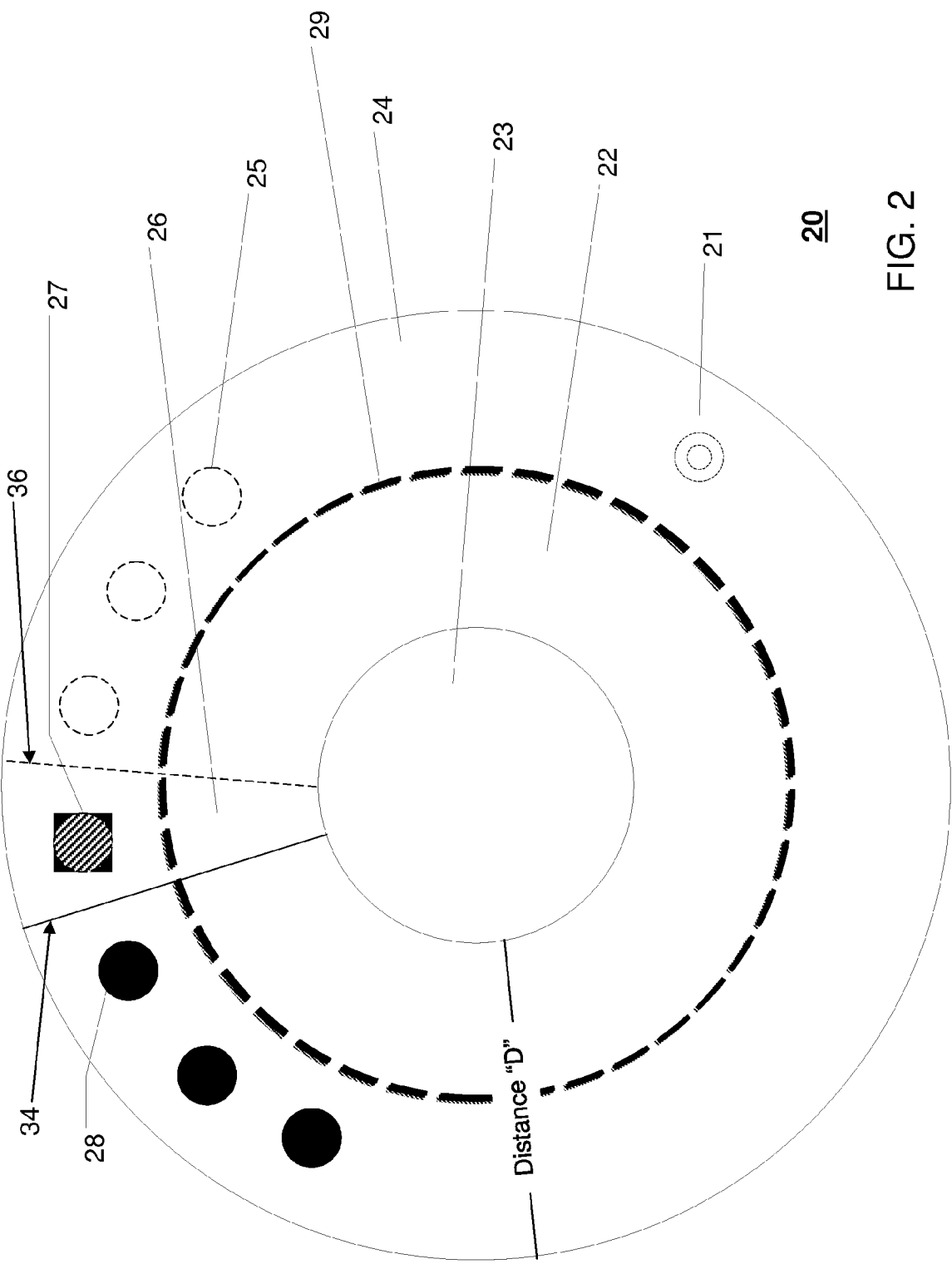
FIG. 2 is a front plan view of a protective petwear collar in accordance with a second embodiment herein.

Referring to FIG. 2, an alternative protective petwear collar 20 is illustrated that includes features providing better comfort and protection for pets recovering from surgery or otherwise needing a means for restricting access to their paws or other portions of their body. Existing inflatable collars tend to become bulky as they inflate in a manner that does not necessarily provide additional protection to pets. Since existing collars are typically sized by determining a distance from the animals neck to their snout, the increased bulk in uncontrolled directions as an inflatable collar inflates can not only create discomfort to a pet, but may also fail to serve the intended purpose of restricting the pet from accessing portions of the body. With this in mind, the embodiment of the protective petwear collar 20 instead uses a different measuring scheme. Instead of measuring from a pet's neck out to their snout, the protective petwear collar 20 is fitted by determining a distance radially outward from the pet's neck. This distance is the distance "D" as illustrated.

The protective petwear collar 20 is also inflatable and includes an air valve 21. The collar 20 is more circular or "C" shaped than the U-shaped collar of FIG. 1. The collar 20 can have multiple air chambers formed by one or more "I-Beams" 29 that are "welded" or hot melted to the opposing top and bottom walls of the collar 20 in a concentric manner within the collar. The top wall is shown in FIG. 2 in a top plan view. In this example, a single I-Beam 29 is illustrated that forms an inner air chamber 22 and an outer air chamber 24. The more I-Beams formed, the more chambers that would exist. The I-Beams are used to control the shape of the collar as it inflates. In this manner, the collar 20 inflates in a more evenly or uniform manner that radiates outward from a pet's neck as it inflates rather than bulging in different directions. The I-Beam construction is apparently used in inflatable pool rafts, but clearly has not been used in inflatable pillows or protective surgical collars as contemplated herein in a manner to control the shape of the inflation in a radial manner. Thus, this radial inflation enables the pet greater access to food or water while creating a protective barrier making it difficult for the pet to access or gnaw on their wounds.

The protective petwear collar 20 includes a neck opening 23 that can be adjusted by not only the inflation of the collar, but with an adjustable attachment mechanism that can be embodied in any number of ways including hook and loop fasteners such as Velcro brand fasteners. In this embodiment, hook and loop fasteners portions 28 can be placed on the top surface of the collar 20 and mating hook and loop fastener portions 25 can be placed on the bottom surface of the collar 20. The collar 20 can be constructed to have the ends 34 and 36 naturally overlap when in an unbiased position as illustrated in FIG. 2. An overlap area 26 is illustrated where hook and loop fasteners meet to formed a fastener juncture 27 between the hook and loop fastener portions on the top surface of the collar and the hook and loop fastener portions on the bottom surface of the collar. The ends 34 and 36 can be biased to close further for use on smaller pet necks or can be biased in an opposing direction to create a gap or opening 33 as illustrated in FIG. 3.

Figure 3:
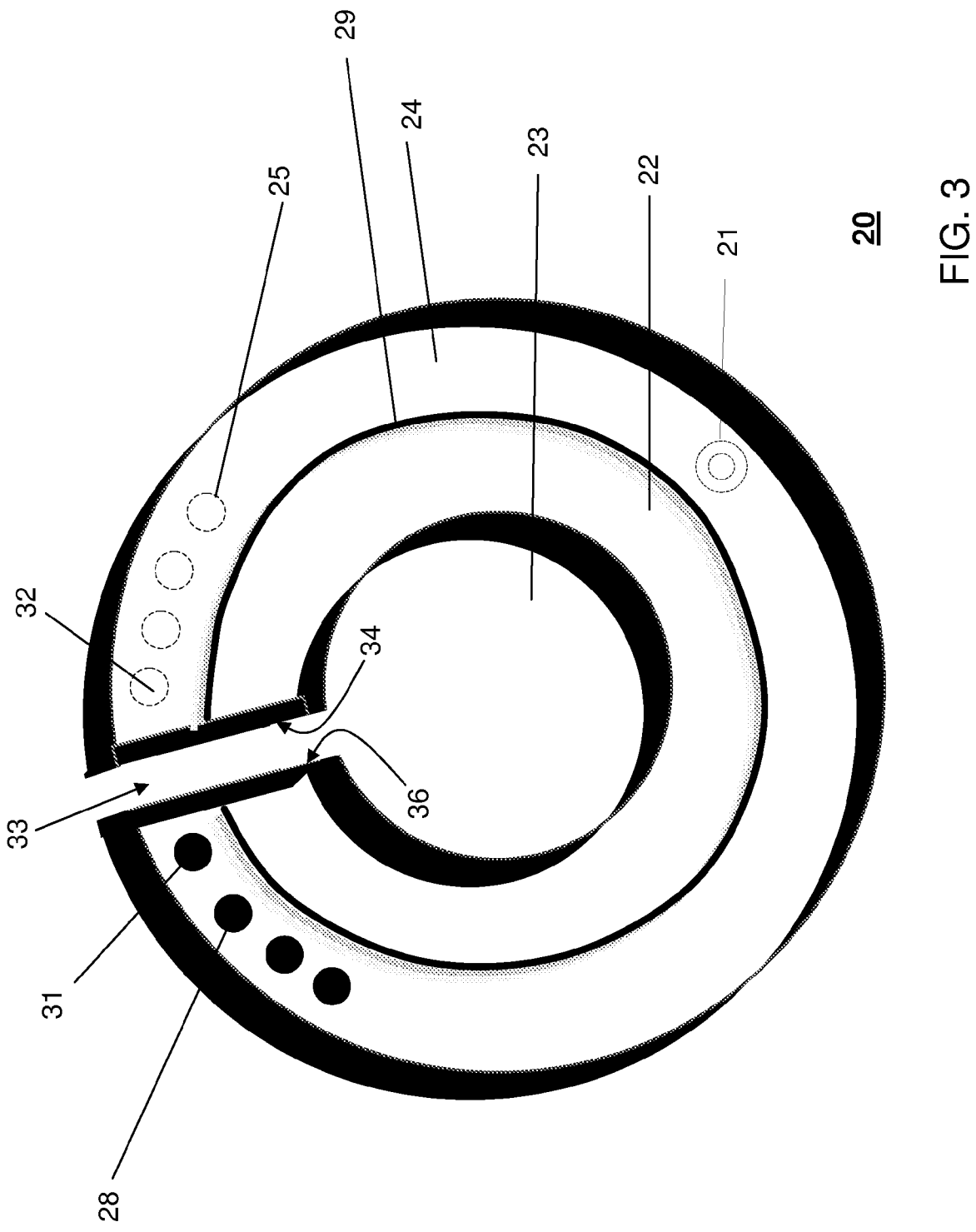
FIG. 3 is a perspective view of the protective petwear collar of FIG. 2.

Referring to FIG. 3, the protective petwear collar 20 is illustrated in a perspective view with the ends 34 and 36 of the collar biased to not be overlapping. As illustrated, the hook and loop fastener portions 31 and 32 are shown unfastened and correspond to the fastener juncture 27 in FIG. 2. The collar 20 as illustrated in the open biased position illustrates an open area 33 formed by the two opposing end portions 34 and 36 that can be used to fit the collar 20 over a pet's neck and then fastened together with the appropriate sizing as illustrated in FIG. 2.

The invention claimed is:
1. A protective petwear collar, comprising:
an inflatable bladder forming a substantially "C" shaped body having a central open area for receiving a neck of a pet and an opening formed by two opposing end portions; said inflatable bladder having a top wall and a bottom wall;
said inflatable bladder being of sufficiently thick construction to support the weight of the head of a pet when lying down;
a valve for inflating the inflatable bladder;
said inflatable bladder comprising at least two inflatable chambers including at least an inflatable inner chamber disposed in at least partially surrounding concentric relation to said open area and an inflatable outer chamber disposed in at least partially surrounding concentric relation to said inner chamber and said open area;
an I-beam disposed between said at least two inflatable chambers and extending at least the majority of the length of said inflatable bladder so as to partially define an exterior wall of said inner chamber and an interior wall of said outer chamber;
said I-beam structured to facilitate even, uniform inflation of said at least two inflatable chambers; wherein said I-Beam extends from said top wall to said bottom wall in a concentric manner within said inflatable bladder;
said at least two inflatable chambers disposed in fluid communicating relation with said valve and in fluid communication with one another such that compression of one of said at least two inflatable chambers caused by a weight of a head of the pet thereon results in expansion of the other of said inflatable chambers,
fasteners for securing the two opposing end portions of the inflatable bladder in overlapping relation to each other.
2. The protective petwear collar of claim 1, wherein the two opposing ends overlap each other when in at least a biased and closed position.
3. The protective petwear collar of claim 1, wherein the two end portions are naturally biased to overlap each other when in an unbiased position.

4. The protective petwear collar of claim 1, wherein said valve is structured for selective deflation of said inflatable inner and outer chambers for compact and efficient storage of said inflatable bladder.

5. The protective petwear collar of claim 1, wherein the inflatable body is made of vinyl.

6. The protective petwear collar of claim 1, wherein said fasteners comprise snaps.

7. The protective petwear collar of claim 1, wherein said fasteners comprise hook and loop fasteners.

8. The protective petwear collar of claim 1, wherein the pet collar is sized for a pet using a distance measured radially outward from the central aperture area to an outer portion of the inflatable body which would correspond to a distance from a pet's neck radially outward.

* * * * *